United States Patent Office 3,560,535
Patented Feb. 2, 1971

3,560,535
PROCESS FOR PRODUCTION OF ALKYL ESTERS FROM ALKYL CARBOXYLIC ACID ANHYDRIDES
Gustave Bryant Bachman, Lafayette, Ind., and Gerald M. Tullman, Creve Coeur, Mo., assignors to Purdue Research Foundation, Lafayette, Ind., a corporation of Indiana
No Drawing. Filed Dec. 19, 1968, Ser. No. 785,351
Int. Cl. C07c 67/00
U.S. Cl. 260—410.9
3 Claims

ABSTRACT OF THE DISCLOSURE

A process for preparing alkyl esters by reacting iodine with an alkyl carboxylic acid anhydride in the presence of ozone to form the iodine triacylate, adding mercuric oxide and heating at a temperature of about 115–50° C. thereby producing said ester.

BACKGROUND OF THE INVENTION

This invention relates to a process for the preparation of alkyl esters from alkyl carboxylic acid anhydrides. In a particular aspect, this invention relates to a process for the preparation of alkyl esters from alkyl carboxylic acid anhydrides.

Alkyl esters are well known chemical compounds and methods for preparing them have been described in a number of publications. The usual method of preparation is by reaction of an aliphatic alcohol with an aliphatic carboxylic acid or anhydride thereof in the presence of a dehydration catalyst such as sulfuric acid, zirconium chloride, etc.

It is known from co-pending application S.N. 779,229 that alkyl esters are obtained by reacting alkyl carboxylic acid anhydrides with mercuric iodate or mercuric iodate-producing substances, such as mercuric iodide and ozone. This process gives good yields of alkyl esters from the lower molecular weight anhydrides, but with increasing chain length the yields diminish so that the process is relatively unsatisfactory for the production of esters wherein the alkyl chain is $C_6$ or greater.

SUMMARY OF THE INVENTION

It is the object of the present invention to provide a new process for the preparation of alkyl esters.

It is another object of the present invention to provide a process for the preparation of alkyl esters from alkyl carboxylic acid anhydrides.

Other objects and advantages of the present invention will be obvious to those skilled in the art from the disclosure herein.

It has been discovered that alkyl esters are obtained in good yield by reacting an alkyl carboxylic acid anhydride corresponding to the formula $(RCO)_2O$ with iodine in the presence of ozone, generally in a molar ratio of from about 3–10:1 of anhydride to iodine, thereby producing iodine triacylate. Mercuric oxide is then added in a mole ratio of at least about 1:1 of the iodine, and the mixture is heated to a temperature sufficient to cause evolution of oxygen and carbon dioxide. The heating is continued until carbon dioxide evolution ceases, and alkyl ester is recovered.

DETAILED DISCUSSION

The process of the present invention is suitable for the preparation of an alkyl ester corresponding to the formula $RCO_2R$ wherein R is an alkyl group of from 1 to 21 carbon atoms using an alkyl carboxylic anhydride corresponding to the formula $(RCO)_2O$. The process can be used for the production of pure symmetrical esters or it can be employed to produce mixed esters by employing mixed anhydrides as the starting material. Generally, however, mixed esters are difficult to separate and have no special advantages, so preferably a relatively pure acid anhydride will be used as the starting material.

The process is essentially a 2-step one, namely, forming iodine triacylate in situ from the anhydride and iodine in the presence of ozone and reacting the iodine triacylate so produced with mercuric oxide at a temperature and for a length of time sufficient to cause evolution of oxygen and carbon dioxide from the reaction mixture, thereby producing the alkyl ester. The temperature at which carbon dioxide and oxygen evolution occurs varies somewhat with the molecular weight of the iodine triacylate, but generally is between about 115–150° C. The length of time required for carbon dioxide and oxygen evolution to be complete is rather short, i.e., within 1–5 min., usually 1–2 min. for amounts of about 0.025 mole, but a longer time is required for large amounts. The time involved is also dependent on the rate of heating.

The following equations are believed to represent the 2-step reaction, but it is understood that they are presented only for illustrative purposes, and it is not intended that the invention be limited thereby:

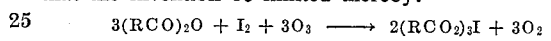

The reaction of the anhydride with iodine and ozone takes place at ordinary temperatures. An inert solvent can be employed if preferred or an excess of the anhydride can be used as a solvent. The iodine can be added directly to the anhydride or if preferred it can be dissolved in an inert solvent, and then mixed with the anhydride. The iodine is employed in a mole ratio of from about 1 to 3–10 or more moles of the anhydride. Ozone is then bubbled through the solution until the color of the iodine has disappeared, thus indicating the reaction to be complete. At least three moles of ozone per mole of iodine are required, but for practical reasons, an excess is provided with no attempt to gauge the excess. Generally a 3–10:1 mole ratio will give satisfactory results.

When the reaction of anhydride with iodine is complete, about 1 mole of mercuric oxide per 1 mole of iodine is mixed with what is now largely iodine triacylate and the mixture is heated until gas evolution ceases. The mercuric iodine formed in the reaction is separated by filtration or other suitable means and the crude ester can be used as is or it can be refined by any suitable means, e.g. by distillation if preferred.

The process is generally suitable for the production of alkyl esters from the anhydrides of alkyl carboxylic acids having from 1 to 21 carbon atoms, which represent the most common alkyl carboxylic acids of commerce. The yield of ester is excellent with straight-chain alkyl compounds, but if the alkyl chain is branched at the alpha position, the yields are comparatively poor. The process can also be employed with alkenyl anhydrides, but the unsaturated linkage is usually oxidized by the ozone yielding undesirable products. The process is unsuitable for use with aromatic acid anhydrides due to poor yields of ester.

The iodine and the mercuric oxide employed in this invention are commercially available and the commercial grades are suitable for use.

The ozone can be provided by any satisfactory means. A convenient method is to provide it from oxygen supplied from a commercial cylinder using a Welsbach Ozonator Model T–23 ozone generator, manufactured by the Welsbach Corporation, Philadelphia, Pa. The oxygen is dried before delivery to the ozonator. A convenient method of drying the oxygen is to pass it through a trap containing potassium hydroxide and thence through a tower packed with anhydrous calcium sulfate and potassium hydroxide. It is then delivered to the ozone generator.

Inert solvents useful in the process of the present invention include organic liquids which are non-reactive to acid anhydrides, ozone, iodine, oxygen, mercuric oxide, mercuric iodide, carbon doxide and alkyl esters. Chlorinated or fluorinated hydrocarbons are generally suitable, e.g., tetrachloroethane and trichloroethane. The solvent employed should be selected so that it can be readily separated from the ester during recovery procedures.

The invention will be understood more fully by reference to the following specific examples. It is understood that the examples are presented for the purpose of illustration only and are not intended as a limitation of the invention. In the examples the aliphatic carboxylic acid anhydrides were dried before reaction over $P_2O_5$ under reduced pressure.

EXAMPLE 1

Preparation of amyl caproate

Caproic anhydride, 5.43 g. (0.025 mole) and 0.635 g. (0.0025 mole) of iodine were delivered to a 50-ml. two-necked, round-bottom flask equipped with a Dry Ice-acetone reflux condenser, an ozone inlet tube extending to the bottom of the flask and a magnetic stirring bar. Ozone was passed through the reaction mixture with agitation until the iodine had been converted to iodine tricaproate. This could be observed due to the color change from burgundy to yellow. The ozone inlet tube was then replaced by a nitrogen tube with a stopcock and a weighed ascarite trap for carbon dioxide absorption was attached to the Dry Ice-acetone condenser. The solution was heated with stirring to about 120° C. at which temperature vigorous evolution of gas suddenly occurred accompanied by the appearance of the color of free iodine as it was generated throughout the solution.

Gas evolution ceased in about 1 minute and the color of free iodine disappeared. Yellow mercuric iodide soon precipitated leaving a colorless supernatant solution. Upon cooling, the yellow mercuric iodide was converted to the red crystalline form. The reaction flask was then placed in the Dry Ice-acetone bath, the nitrogen inlet tube stopcock was opened, and the carbon dioxide evolved by the reaction was swept through the ascarite trap. It was found that 0.323 g. (0.00735 mole) was obtained.

The mercuric iodide was separated by filtration and the clear remaining liquid was analyzed in a gas chromatograph. It was found that amyl caproate, 12.7 g. (0.0068 mole) was obtained, giving a yield of 91% based on the iodine.

EXAMPLES 2–7

The experiment of Example 1 was repeated in all essential details except that representative acid anhydrides were substituted for caproic anhydride. In Example 3, 1,1,2,2-tetrachloroethane in a ratio of about 1:1 by volume of anhydride was used as a solvent. In Example 5, 1,2,3-trichloropropane was used as a solvent in a volume ratio of 7:1 of stearic anhydride. The results are given in the following table.

EXAMPLES 2–7

[Symmetrical esters produced from the reaction of anhydrides with iodine and ozone, followed by thermal decomposition in the presence of mercuric oxide]

| Example No.: | Anhydride [1] | $CO_2$ (mol equivalent) | Ester, (mol equivalent) | Yield, (percent) |
|---|---|---|---|---|
| 2 | Propionic | 2.68 | Ethyl propionate, 2.56 | 85.5 |
| 3 | Valeric [2] | 2.98 | Butyl valerate, 2.28 | 76 |
| 4 | Octanoic [3] | 2.76 | Heptyl octanoate, 2.20 | 73.5 |
| 5 | Stearic [4] | | Heptadecyl stearate, 2.06 | 69 |
| 6 | 2-methylbutyric [3] | 2.36 | sec-Butyl 2-methylbutyrate, 0.52 | 17.3 |
| 7 | Pivalic | 2.00 | t-Butyl pivalate, 0.46 | 15.4 |

[1] The anhydride was present in ten-fold molar excess except where otherwise noted; 1.0 mole equivalent of iodine was present in each case.
[2] 1,1,2,2-tetrachloroethane as solvent.
[3] Anhydride present in eight-fold molar excess.
[4] 3.0 mole equivalents of anhydride present; 1,2,3-trichloropropane as solvent.

We claim:
1. A process for the production of alkyl esters corresponding to the formula $RCO_2R$ wherein R is an alkyl group of from 1 to 21 carbon atoms comprising the steps of (a) reacting an alkyl carboxylic acid anhydride corresponding to the formula $(RCO)_2O$ with iodine in the presence of ozone, said anhydride and said ozone being in a molar ratio of from about 3–10:1 of said iodine, thereby producing iodine triacylate, (b) adding mercuric oxide in a mole ratio of about 1:1 of said iodine, (c) heating to a temperature sufficient to cause evolution of oxygen and carbon dioxide and continuing said heating until said carbon dioxide evolution ceases, and (d) recovering said alkyl ester.

2. The process of claim 1 wherein the heating step is carried out within the temperature range of about 115–150° C.

3. The process of claim 1 wherein the reaction is carried out in the presence of an inert solvent selected from the group consisting of chlorinated and fluorinated hydrocarbons.

References Cited

Chem. Abstracts, vol. 35, 6926 [3] (1941).

ELBERT L. ROBERTS, Primary Examiner

G. RIVERS, Assistant Examiner

U.S. Cl. X.R.

260—488, 408, 540

PO-1050
(5/69)

UNITED STATES PATENT OFFICE
CERTIFICATE OF CORRECTION

Patent No. 3,560,535    Dated February 2, 1971

Inventor(s)  G. B. Bachman and G. M. Tullman

It is certified that error appears in the above-identified patent and that said Letters Patent are hereby corrected as shown below:

Column 1, line 17, "115-50°C" should be --115-150°C--.
Column 3, line 7, "doxide" should be --dioxide--.

Signed and sealed this 18th day of May 1971.

(SEAL)
Attest:

EDWARD M. FLETCHER, JR.
Attesting Officer

WILLIAM E. SCHUYLER,
Commissioner of Pate